(12) United States Patent
Butler et al.

(10) Patent No.: US 6,260,086 B1
(45) Date of Patent: Jul. 10, 2001

(54) CONTROLLER CIRCUIT FOR TRANSFERRING A SET OF PERIPHERAL DATA WORDS

(75) Inventors: Bart Lee Butler; Irfan Mohamedali Furniturewala; John Graham Frierson, all of Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/218,515

(22) Filed: Dec. 22, 1998

(51) Int. Cl.[7] .............................. G06F 13/00; G06F 3/00
(52) U.S. Cl. .................. 710/100; 710/1; 710/4; 710/30; 710/65
(58) Field of Search ...................... 710/1, 3, 4, 8, 710/9, 30, 52, 65, 100

(56) References Cited

U.S. PATENT DOCUMENTS

| | | | |
|---|---|---|---|
| 3,953,838 | * 4/1976 | Gilberg et al. | 365/78 |
| 4,245,307 | * 1/1981 | Kapeghian et al. | 710/107 |
| 4,683,534 | * 7/1987 | Tietjen et al. | 710/127 |
| 4,775,931 | * 10/1988 | Dickie et al. | 710/9 |
| 4,899,306 | * 2/1990 | Greer | 710/64 |
| 5,191,582 | * 3/1993 | Upp | 370/392 |

* cited by examiner

*Primary Examiner*—Xuan M. Thai
(74) *Attorney, Agent, or Firm*—Randi L. Dulaney

(57) ABSTRACT

A controller circuit (100) includes an aliasing circuit (261) for efficiently transferring a set of peripheral data words between a microprocessor (130) and a serial peripheral device (140) that has a first in and first out (FIFO) register (220). The aliasing circuit aliases sequential addresses within a predetermined range of addresses that are generated by the microprocessor during a load multiple or store multiple command, wherein each of the sequential addresses is associated with one peripheral data word of the set of peripheral data words. The serial peripheral device comprises the FIFO register and a data bus register (210) for transferring each peripheral data word between the FIFO register and the microprocessor. A central processing unit (CPU) (125) of the microprocessor uses a CPU word that is not necessarily the same length as the peripheral data word.

7 Claims, 2 Drawing Sheets

CONTROLLER CIRCUIT FOR TRANSFERRING A SET OF PERIPHERAL DATA WORDS

FIELD OF THE INVENTION

This invention relates in general to controller circuits, and in particular to the transfer of a set of peripheral data words between a microprocessor and a serial communication peripheral device having a first in first out word memory.

BACKGROUND OF THE INVENTION

The amount of memory locations needed to store program instructions and the number of instruction execution cycles required to accomplish a data transfer function in a controller circuit comprising a microprocessor is an important design parameter of a portable electronic device such as a pager, a personal organizer, or a cellular phone. This is because the number of instruction execution cycles relates directly to the amount of time required to complete a function, which directly affects a battery discharge life of such portable electronic device, and because the number of program instructions relates directly to the amount of program memory required for the function, which directly affects the cost of such portable devices.

A function that is commonly used in the microprocessor of such portable devices is a transfer of a set of data words between a microprocessor and a conventional serial communication peripheral device such as a universal asynchronous receiver transmitter (UART) or a serial peripheral interface (SPI). The transfer either transfers the set of data words from the CPU to the serial communication peripheral device for subsequent transmission of the set of data words from the serial communication peripheral device using a bit serial signaling technique, or the transfer transfers the set of data words to the CPU from the serial communication peripheral device that have been received by the serial communication peripheral device using a bit serial signaling technique. In such serial communication peripheral devices a word memory is used to temporarily store the data words that are being serially received or transmitted by the serial communication peripheral device, because the transfer rate used over the serial communications link is typically substantially slower than the transfer rate between the serial communication peripheral device and the CPU. The temporary memory is typically a conventional first in first out (FIFO) register memory that loads and unloads words stored in the well known FIFO manner. The data words stored in the FIFO register are transferred one at a time between the serial communication peripheral device and the CPU through a memory mapped single word register that is within the serial communication peripheral device. The transfer of the data words is typically accomplished by addressing the serial communication peripheral device with one of two predetermined memory mapped addresses each time a data word is transferred: a first address for loading a data word from the serial communication peripheral device into the CPU and a second address for storing a data word into the serial communication peripheral device from the CPU.

Many newer low cost microprocessors, referred to as RISC processors, operate using a reduced instruction set, and typically include not only the single word load instruction and single word store instruction that are invariably provided in any processor, but also include a load multiple instruction and a store multiple instruction. These load and store multiple instructions accomplish a transfer of a entire set of data words using a single program instruction, which is a very efficient technique for transferring a set of data words to a random access memory (RAM). Unfortunately, the load and store multiple instructions are (each) incompatible with a transfer of a set of data words between the CPU and a conventional serial communication peripheral device that uses a data register having a single memory mapped address for a one way transfer of the data words. This incompatibility is due to the fact that the load and store multiple instructions transfer each data word using an associated address that is incremented after each data word in the set of data words.

Thus, what is needed is a technique to transfer a set of data words between a CPU and a serial communication peripheral device when the CPU has the capability to use a load or store multiple instruction and the serial communication peripheral device includes a data register having a single memory mapped register to transfer each data word.

DETAILED DESCRIPTION OF THE DRAWINGS

Figure 1:
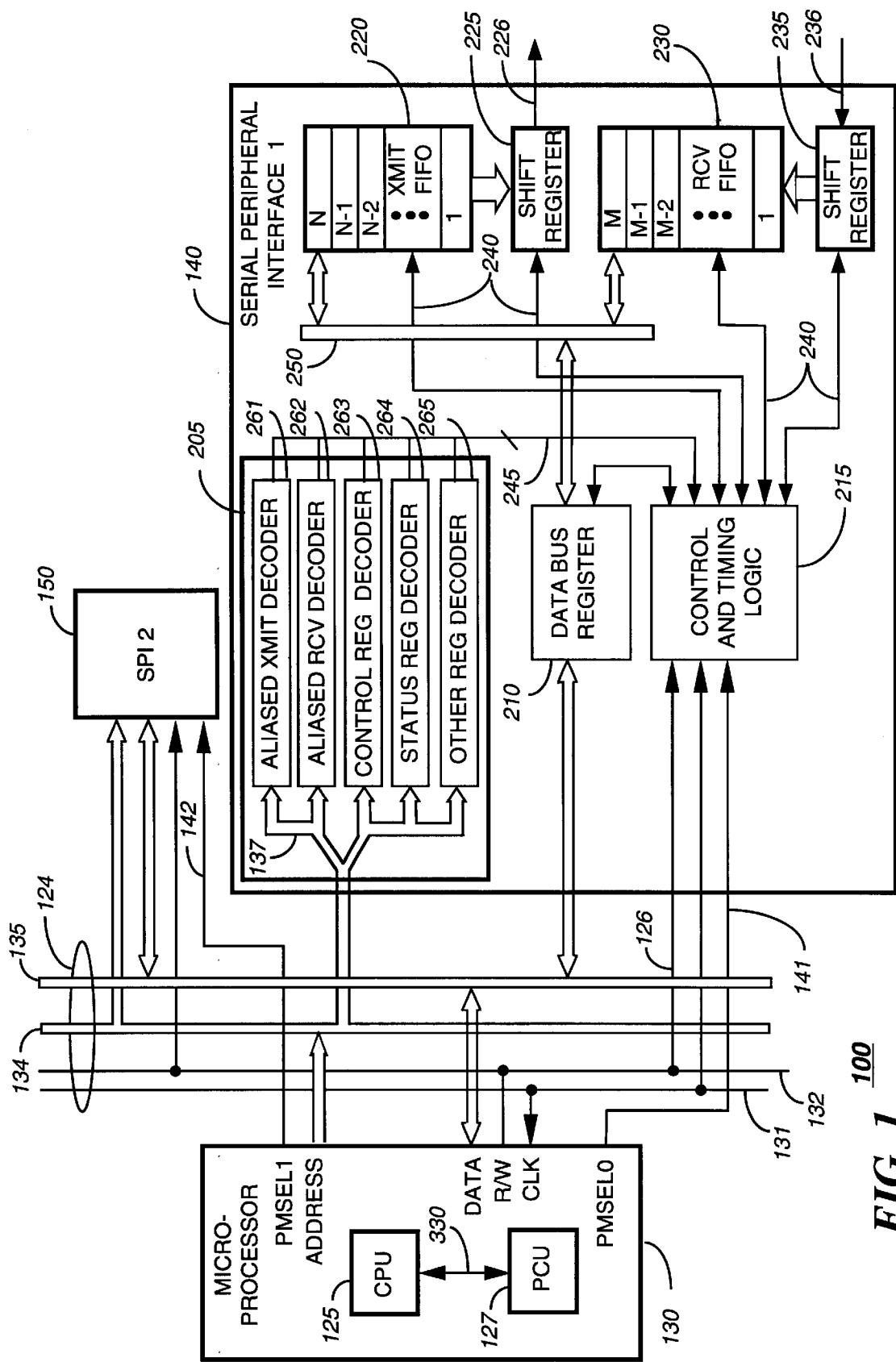
FIG. 1 is an electrical block diagram of an electronic circuit within which a set of peripheral data words is transferred between a microprocessor and a serial peripheral interface, in accordance with the preferred embodiment of the present invention.

Referring to FIG. 1, an electrical block diagram of a portion of a controller circuit 100 is shown, in accordance with the preferred embodiment of the present invention. The portion of the controller circuit 100 comprises a microprocessor 130, a first serial peripheral interface (SPI) 140 (shown as SPI 1 in FIG. 1), a second SPI 150 (shown as SPI 2 in FIG. 1), and a peripheral logic bus 124 which couples the microprocessor 130 to the SPIs 140, 150. The microprocessor 130 comprises a CPU 125 and a peripheral control unit (PCU) 127. The SPI 140, the SPI 150, the CPU 125, and the PCU 127 are preferably individual logic blocks that are designed into and interconnected within a single integrated circuit. The CPU 125 is a conventional CPU of the reduced instruction set type, commonly referred to as a RISC processor. The CPU 125 is preferably a 32 bit RISC processor of the ARM 7 family of RISC processors which has a CPU bus 330 (shown in FIG. 2) comprising a 32 bit CPU data bus and a 32 bit CPU address bus. The CPU 125 is licensed from Advanced RISC Machine, Ltd. of Cambridge, Mass. The SPI 140 and SPI 150 each have two 16 bit first in first out (FIFO) registers, and are each a modified conventional SPI block that has unique modifications to a memory mapped address select circuit 205. The unique modifications are described in detail with respect to SPI 140, but the description applies to SPI 150 in a similar manner. The SPIs 140, 150 provide for sending and receiving of data using conventional bit serial signals 226, 236. The data is transferred in parallel between the CPU 125 and the SPIs 140, 150 over the peripheral logic bus 124, which comprises a clock signal 131, a read write control signal (R/W signal 132), a peripheral address bus 134, and a peripheral data bus 135. A crystal and an oscillator drive circuit (not shown in FIGS. 1 and 2) are used to generate the clock signal 131 which is distributed within the peripheral logic bus 124. The peripheral address bus 134 has 6 signal lines and the peripheral data bus 135 has 16 lines.

The CPU 125 executes, among other commands, a store command, a load command, a store multiple command, and a load multiple command. The store and load commands are conventional commands which respectively write and read a 32 bit data word to a single address associated with the respective command. The store multiple and load multiple commands are conventional commands which respectively write and read a set of successive 32 bit data words to a corresponding set of sequential addresses associated with the command. The store and load commands are referred to herein collectively as transfer commands, and the store multiple and load multiple commands are referred to herein collectively as transfer multiple commands. Of the addresses which the CPU 125 can use for transferring data, some are reserved as CPU peripheral addresses that are used for transferring data between the CPU 125 and peripherals coupled to the peripheral logic bus 124. Of the peripheral addresses, some are reserved for the SPI 140. These are referred to herein as CPU-SPI1 addresses. When the CPU performs a store command at a CPU-SPI1 address, the PCU 127 determines that data is to be written to the SPI 140, and the 32 bit data word written by the CPU 125 is decoded by the PCU 127 into two 16 bit data words that are successively coupled to the peripheral data bus 135. The PCU 127 decodes the CPU-SPI1 address by stripping off higher order bits and generates from the decoded CPU-SPI1 address two 6 bit addresses by using the decoded CPU-SPI1 addresses for one of the two 16 bit words and by incrementing and using the decoded CPU-SPI1 address for the other of the two 16 bit data words. These two addresses, herein referred to as the peripheral addresses, are each coupled to the peripheral address bus 134 with the respective 16 bit word. The PCU 127 generates the 2 sixteen bit words by using the sixteen least significant bits for one and the sixteen most significant bits for the other. The PCU 127 generates each successive 16 bit word in response to successive cycles of the clock signal 131 and couples the 16 bits words to the peripheral data bus 135. The PCU 127 also generates the read/write (R/W) signal 132 in a write state and generates the correct one of the PMSEL signals 141, 142 when the CPU 125 writes to one of the SPIs 140, 150.

When the CPU 125 performs a store multiple command, the CPU 125 associates sequential addresses with the successive 32 bit words, but the addresses are offset by an value sufficient to allow the PCU 127 to increment the lower order bits without generating redundant peripheral addresses. In an example of address decoding by the PCU 127 in the preferred embodiment of the present invention, a store multiple command of 4 thirty two bit words from the microprocessor 130 to the SPI 140 is performed. The CPU 125 writes (stores) data comprising 4 thirty two bit words stored in four registers R0, R1, R2, and R3 within the CPU 125, with peripheral addresses $1000, $1004, $1008, $100C. The PCU 127 decodes the 4 thirty two bit words into 8 sixteen bit words, and generates associated addresses of $0, $2, $4, $6, $8, $A, $C, and $E on peripheral address bus 134.

When the CPU 125 performs a load multiple command with an associated peripheral address, the PCU 127 asserts the R/W signal 132 in a read state, asserts an appropriate PMSEL signal, and generates addresses in a manner corresponding to that described above with reference to the CPU 125 performing a store multiple command. In this case, the PCU 127 generates a thirty two bit word from two sixteen bit words that are read from the peripheral data bus 135, as will be understood by one of ordinary skill in the art.

In summary, a set of sixteen bit words, also referred to herein as a set of peripheral data words (8 sixteen bit words in the example described above), is transferred between the microprocessor 130 and the SPI 140. The PCU 127 converts each subset of two successive peripheral data words in the set of peripheral data words to a 32 bit word, also referred to herein as a CPU word, during a load multiple command, and converts each CPU word to a subset of two successive peripheral data words in the set of peripheral data words during a store multiple command. It will be appreciated that other conversions are possible in accordance with the present invention, such as a four to one conversion between CPU words of thirty two bits and four peripheral data words of eight bits, or a one to one conversion wherein a sixteen bit CPU generates sixteen bit words that are also used as the peripheral data words. Thus, the PCU 127 performs a conversion between CPU words of a first length and peripheral data words of a second length.

The SPI 140 comprises a uniquely configured address select circuit 205, a data bus register 210, a control and timing logic section 215, a transmit FIFO register 220, a transmit shift register 225, a receive FIFO register 230, and a receive shift register 235. The control and timing logic section 215 is coupled to the data bus register 210, the transmit FIFO register 220, the receive FIFO register 230, the transmit shift register 225, and the receive shift register 235 by interface signals 240. The interface signals include conventional bit clock signals that are coupled to the transmit shift register 225 and receive shift register 235, and conventional control signals that are coupled to the data bus register 210, the transmit FIFO register 220, and the receive FIFO register 230. The control and timing logic section 215 is coupled to the microprocessor 130 by the clock signal 131, the R/W signal 132, and the PMSEL0 signal 141. The data bus register 210 is coupled to the peripheral data bus 135 at a peripheral data bus port, and is also coupled to the FIFO registers 220, 230 by an internal data bus 250. The data bus register 210 transfers peripheral data words between the microprocessor 130 and the FIFO registers 220, 230.

The SPI 140 receives serial data within the bit serial signal 236 coupled to the receive shift register 235, which converts the serial data to 16 bit data words which are coupled in parallel to the receive FIFO register 230. The receive FIFO register 230 queues up a set of the 16 bit data words when they cannot be transferred to the microprocessor 130 as fast as they are received, in a conventional manner. When the CPU 125 is ready to receive the set of peripheral (16 bit data) words, they are communicated one peripheral data word at a time through the data bus register 210 to the CPU 125 in response to a load multiple command. The receive FIFO register 230 can queue up a predetermined maximum number of data words, M, which in accordance with the preferred embodiment of the present invention, is 16.

The SPI 140 also receives a set of peripheral data words from the microprocessor 130, which are communicated one word at a time, in parallel, by the peripheral logic bus 124 to the data bus register 210 as a result of a store multiple command. The transmit FIFO register 220 queues up the sixteen bit words when they are received at the SPI 140 and when the rate of reception is faster than the rate of transmission (which is the typical case). The transmit FIFO register 220 can queue up a predetermined maximum number, N, of 16 bit data words, preferably 16 data words. The 16 bit data words stored in the transmit FIFO register 220 are coupled one at a time to the transmit shift register 225, wherein they are converted to serial data and transmitted in the bit serial signal 226 coupled to an output of the transmit shift register 225. The 16 bit data words are transmitted in a conventional serial control protocol, well known to one of ordinary skill in the art.

In summary, a set of peripheral data words is transferred between the microprocessor 130 and the SPI 140 one word at a time, meaning that the set of peripheral data words is either read to the microprocessor 130 from the SPI 140 or written from the microprocessor 130 into the SPI 140 in response to a transfer multiple command.

In accordance with the preferred embodiment of the present invention, the address select circuit 205 of the SPI 140 comprises an aliased transmit decoder (ALIASED XMIT DECODER) 261, an aliased receive decoder (ALIASED RCV DECODER) 262, a control register decoder 263, a status register decoder 264 and other register decoders 265. The control, status, and other decoders 263, 264, 265 are conventional and each provide decoding of a single conventional memory mapped address for the standard functions of loading and storing control, status, and other information. The aliased transmit decoder 261 and aliased receive address decoder 262 are modified from address decoders of a conventional serial peripheral device in that they eliminate one or more of the lower order address signals when determining whether the SPI 140 should respond to an address on the peripheral address bus 134. The modification to the aliased transmit decoder 261 causes the aliased transmit decoder 261 to respond to all of a first predetermined range of "aliased" addresses. Similarly, the modification to the aliased receive decoder 262 causes the aliased receive decoder 262 to respond to all of a second predetermined range of "aliased" addresses. The aliased transmit decoder 261 and aliased receive decoder 262 are hereinafter generically referred to as aliased transfer decoders 261, 262, and also simply as alias circuits. The aliased transfer decoders 261, 262 are coupled to a subset 137 of the peripheral address bus 134 that corresponds to the higher order addresses not eliminated in the aliased decoding. The first and second predetermined ranges of addresses that are aliased is a design parameter determined by the maximum size of the set of peripheral data words that are to be transferred. As an example, when the number of peripheral data words that are typically transferred is 8, then 3 address signal lines are eliminated from the decoding and eight addresses are thereby aliased.

In accordance with the preferred embodiment of the present invention, when the SPI 140 is modified in this manner and when the microprocessor 130 is a microprocessor of a type that is responsive to a load multiple instruction and store multiple instruction (i.e., a transfer multiple instruction), then a transfer of a set of peripheral data words is efficiently accomplished by the use of a single transfer multiple instruction. The transfer multiple instruction generates a set of sequential addresses within the predetermined range of addressed reserved for the SPI 140, wherein each of the sequential addresses is associated with one peripheral data word of the set of peripheral data words to be transferred either from the CPU 125 to one of the FIFO register's 220, 230, or vice versa. When the aliased circuit for which the associated consecutive address is within the predetermined range receives an associated consecutive address on the subset 137 of the peripheral address bus 134, the aliased circuit generates a transfer control signal 245. In response to the transfer control signal 245, the data bus register 210 (which is a bi-directional data bus register) either performs a CPU load or store operation, depending on whether the aliased circuit that decodes the associated consecutive address is the aliased transmit decoder 261 or aliased receive decoder 262. A transfer of a peripheral data word between one of the transmit FIFO register 220 and the receive FIFO register 230 and the CPU 125 is effected. This process continues for each peripheral data word in the set of peripheral data words, accomplishing the transfer of the entire set of peripheral data words with one transfer multiple instruction.

It will be appreciated that the SPI 140 described above is representative of a class of serial peripheral devices that have one or more FIFO registers and that are capable of transferring a set of peripheral data words to or from a microprocessor. An example of another member of this class is a universal asynchronous receiver transmitter (UART), which can be modified in the manner described above with reference to the SPI 140 to provide the same benefits. It will be also appreciated that the microprocessor 130 can be a microprocessor of alternative design that includes a command of the transfer multiple type described herein, such as on based on a microprocessor of the Pentium family of microprocessors made by Intel Corporation of Santa Clara, Calif.

It will be further appreciated that an alternative embodiment of the present invention is possible which provides the same benefits without modifying a conventional serial peripheral device. In the alternative embodiment, aliasing circuitry is added between the peripheral data bus 135 and the peripheral device (in this case, the SPI 140). The aliasing circuitry generates a peripheral aliasing address for each address received that is within the predetermined range of addresses reserved for the peripheral. The peripheral aliasing address is a predetermined transfer address of the conventional serial peripheral device. This architecture has disadvantages in that it uses more circuitry (the aliasing circuit that must generate the full predetermined transfer address plus a full decoding address register in the peripheral device), and time must be taken to design in the aliasing circuit when a peripheral device of the class described herein is designed into a new controller circuit, which adds design costs.

In a conventional prior art controller circuit (that is, one which has a conventional serial communication peripheral device and does not have the aliasing modifications explained herein, a set of peripheral data words is transferred between a microprocessor and a SPI (or other serial communication peripheral device having a FIFO word register) by using a (single) transfer command to consecutively transferring one word at a time and associating with each transfer one single address. For example, to send a set of peripheral data words to the SPI 140, the microprocessor in a prior art controller circuit is programmed to store each peripheral data word to a predetermined address such as $3A56. Table 1 shows the number of memory accesses required to execute write instructions for a prior art controller ("w/o aliasing") and the preferred embodiment of the present invention ("with aliasing").

TABLE 1

| Number of peripheral words written | External Memory Accesses to fetch op codes | | Peripheral memory accesses | | Total Memory Accesses | |
|---|---|---|---|---|---|---|
| | w/o aliasing | with aliasing | w/o aliasing | with aliasing | w/o aliasing | with aliasing |
| 4 | 4 | 1 | 4 | 4 | 8 | 5 |
| 8 | 8 | 1 | 8 | 8 | 16 | 9 |
| 16 | 16 | 1 | 16 | 16 | 32 | 17 |

The difference in the number of memory accesses shown in Table 1 and the use of the transfer multiple command instead of a plurality of transfer commands results in reductions of 20% to 51.7% from execution times of a prior art controller circuit to execution times of the preferred embodiment of the present invention, depending on the number of wait cycles used and the number of words written.

Figure 2:
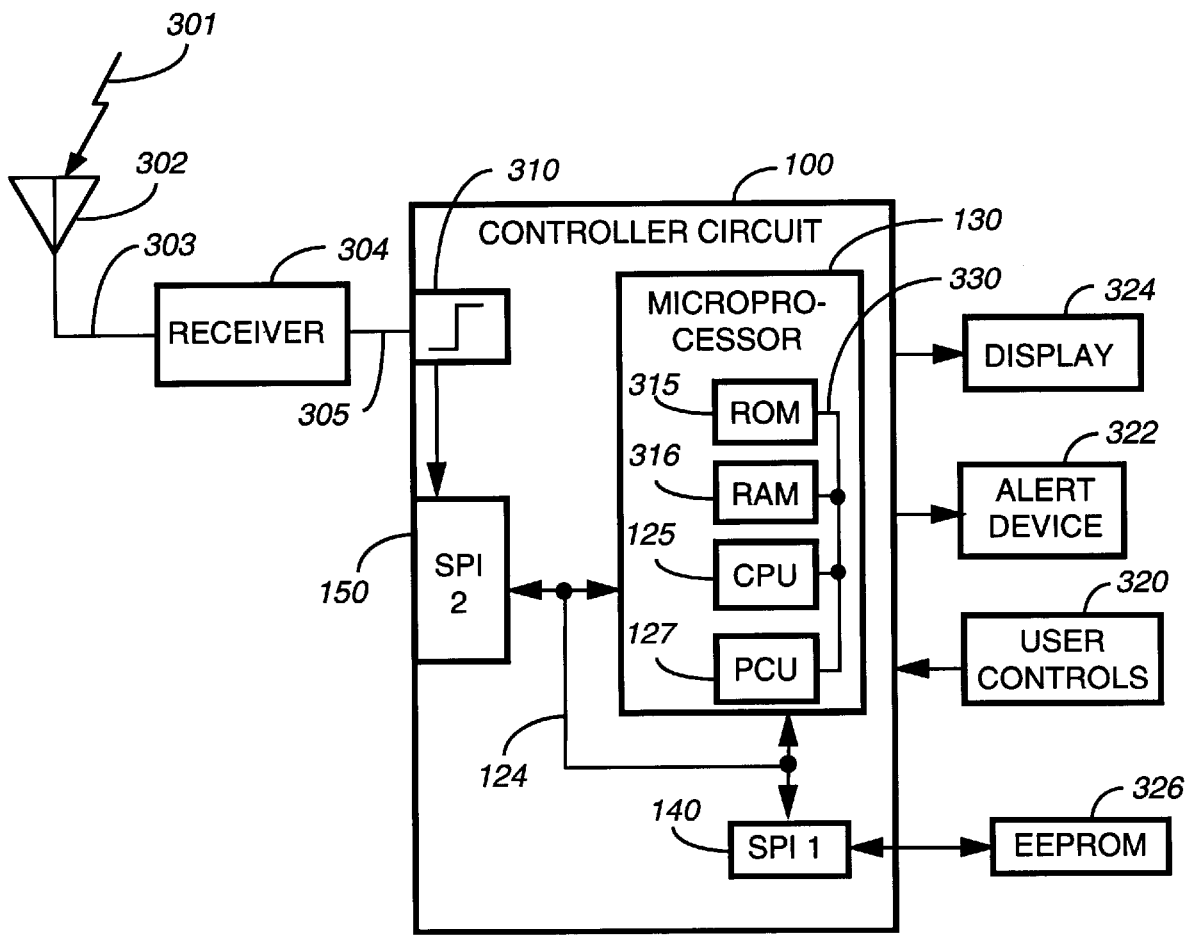
FIG. 2 is an electrical block diagram of a radio using the electronic circuit of FIG. 1, in accordance with the preferred embodiment of the present invention.

Referring to FIG. 2, an electrical block diagram of a radio 300 is shown, in accordance with the preferred and alternative embodiments of the present invention. The radio 300 is a selective call radio that includes an antenna 302 for intercepting a radiated signal 301. The antenna 302 converts the radiated signal 301 to a conducted radio signal 303 that is coupled to a conventional receiver 304 wherein the conducted radio signal 303 is received in a conventional manner. The receiver 304 generates a demodulated signal 305 that is coupled to the controller circuit 100. The controller circuit 100 is coupled to a display 324, an alert 322, a set of user controls 320, and an electrically erasable read only memory (EEPROM) 326. The controller circuit 100 comprises a signal squaring circuit 310 and the microprocessor 130 which is coupled by the peripheral logic bus 124 to the SPIs 140, 150. The demodulated signal 305 is coupled to the signal squaring circuit 310 wherein it is converted to a binary signal that is coupled to the SPI 140, wherein the bits are converted to parallel data words and coupled to the microprocessor 130 by the peripheral logic bus 124, as described above with reference to FIG. 1. The SPI 140 is coupled to the EEPROM 326 for storing an embedded address stored therein during a maintenance operation and for loading the embedded address during normal operations of the radio 300. The microprocessor 130 comprises the CPU 125, the PCU 127, a read only memory (ROM) 315, and a random access memory 316 coupled by the CPU bus 330. The ROM stores program instructions that control the CPU 125 and the RAM 316 provides temporary memory storage.

A message processor function decodes outbound words and processes an outbound message when an address received in the address field of the outbound signaling protocol matches the embedded address stored in the EEPROM 326, in a manner well known to one of ordinary skill in the art for a selective call radio. An outbound message that has been determined to be for the radio 300 by the address matching is processed by the message processor function according to the contents of the outbound message and according to modes set by manipulation of the set of user controls 320, in a conventional manner. An alert signal is typically generated when an outbound message includes user information. The alert signal is coupled to the alert device 322, which is typically either an audible or a silent alerting device.

When the outbound message includes alphanumeric or graphic information, the information is displayed on the display 324 in a conventional manner by a display function at a time determined by manipulation of the set of user controls 320.

All the parts are conventional but for the SPIs 140, 150. The ROM 315 has a set of masked program instructions that are uniquely designed to take advantage of the benefits afforded by the present invention, in that transfer multiple commands are used to transfer sets of peripheral data words between the microprocessor 130 and the unique SPIs 140, 150. Although the CPU 125 is preferably a member of the ARM 7 family of RISC processors, it could alternatively be a member of another processor family that provides transfer multiple instructions.

It will be appreciated that in yet another alternative embodiment of the present invention, the peripheral device, which has been described herein as a SPI device having bidirectional transfer capability, can alternatively implemented having only receive (load) capability or only transmit (store) capability when data is only to be transferred in one direction. This has the advantage of requiring less power and taking less space than a bidirectional serial peripheral device. Such an embodiment could be used for the SPI 150.

It will be further appreciated that the radio 300 is representative of other electronic devices that are not intended to receive and transmit radio frequency signals, such as tape recorders, telephone instruments, and computers, and that can also benefit from the present invention.

By now it should be appreciated that there has been provided an controller circuit 100 which uses aliasing in a unique manner to provide reduction of program execution time and reduction of program instruction memory requirements lower energy usage in comparison to prior art electronic circuits.

We claim:

1. A controller circuit that transfers a set of peripheral data words, comprising:

a microprocessor that performs a transfer multiple command by generating sequential addresses within a predetermined range of addresses, wherein each of the sequential addresses is associated with one peripheral data word of the set of peripheral data words; and a peripheral device, comprising
      an aliasing circuit, coupled to the microprocessor, that is responsive only to addresses within the predetermined range of addresses for generating a transfer control signal, wherein the aliasing circuit generates the transfer control signal in response to each of the sequential addresses,
      a first in first out (FIFO) register for storing the set of peripheral data words, and
      a data bus register coupled to the microprocessor, the FIFO register, and the aliasing circuit, wherein the data bus register transfers a peripheral data word in the set of peripheral data words between the microprocessor and the FIFO register in response to the transfer control signal.

2. The controller circuit according to claim 1, wherein the microprocessor comprises:

a central processing unit (CPU) that transfers a CPU word; and a peripheral control unit that combines the peripheral data word with a successive peripheral data word to generate at least a portion of the CPU word.

3. The controller circuit according to claim 1, wherein the microprocessor comprises:

a central processing unit (CPU) that transfers a CPU word; and a peripheral control unit that generates a plurality of peripheral data words by separating the CPU word.

4. The controller circuit according to claim 1, wherein the microprocessor comprises a central processing unit (CPU) that transfers a CPU word, wherein the peripheral data word is a CPU word.

5. The controller circuit according to claim 1, wherein the microprocessor, and the peripheral device are embodied in a single integrated circuit.

6. A controller circuit that transfers a set of peripheral data words, comprising:

a microprocessor that performs a transfer multiple command by generating sequential addresses within a predetermined range of addresses, wherein each of the sequential addresses is associated with one peripheral data word of the set of peripheral data words;

an aliasing circuit, coupled to the microprocessor, that is responsive only to addresses within the predetermined range of addresses for generating an aliased peripheral address, wherein the aliasing circuit generates the aliased peripheral address in response to each of the sequential addresses; and a peripheral device, comprising
- a first in first out (FIFO) register for storing the set of peripheral data words, and
- a data bus register coupled to the microprocessor, the FIFO register, and the aliasing circuit, wherein the data bus register transfers a peripheral data word in the set of peripheral data words between the microprocessor and the FIFO register in response to the aliased peripheral address.

7. A peripheral device, comprising
- an aliasing circuit that is responsive only to addresses within a predetermined range of addresses for generating a transfer control signal;
- a first in first out (FIFO) register for storing a set of peripheral data words; and
- a data bus register having a peripheral data bus port, coupled to the FIFO register and the aliasing circuit, wherein the data bus register transfers a peripheral data word in the set of peripheral data words between the peripheral data bus port and the FIFO register in response to the transfer control signal.

* * * * *